Figure 1:
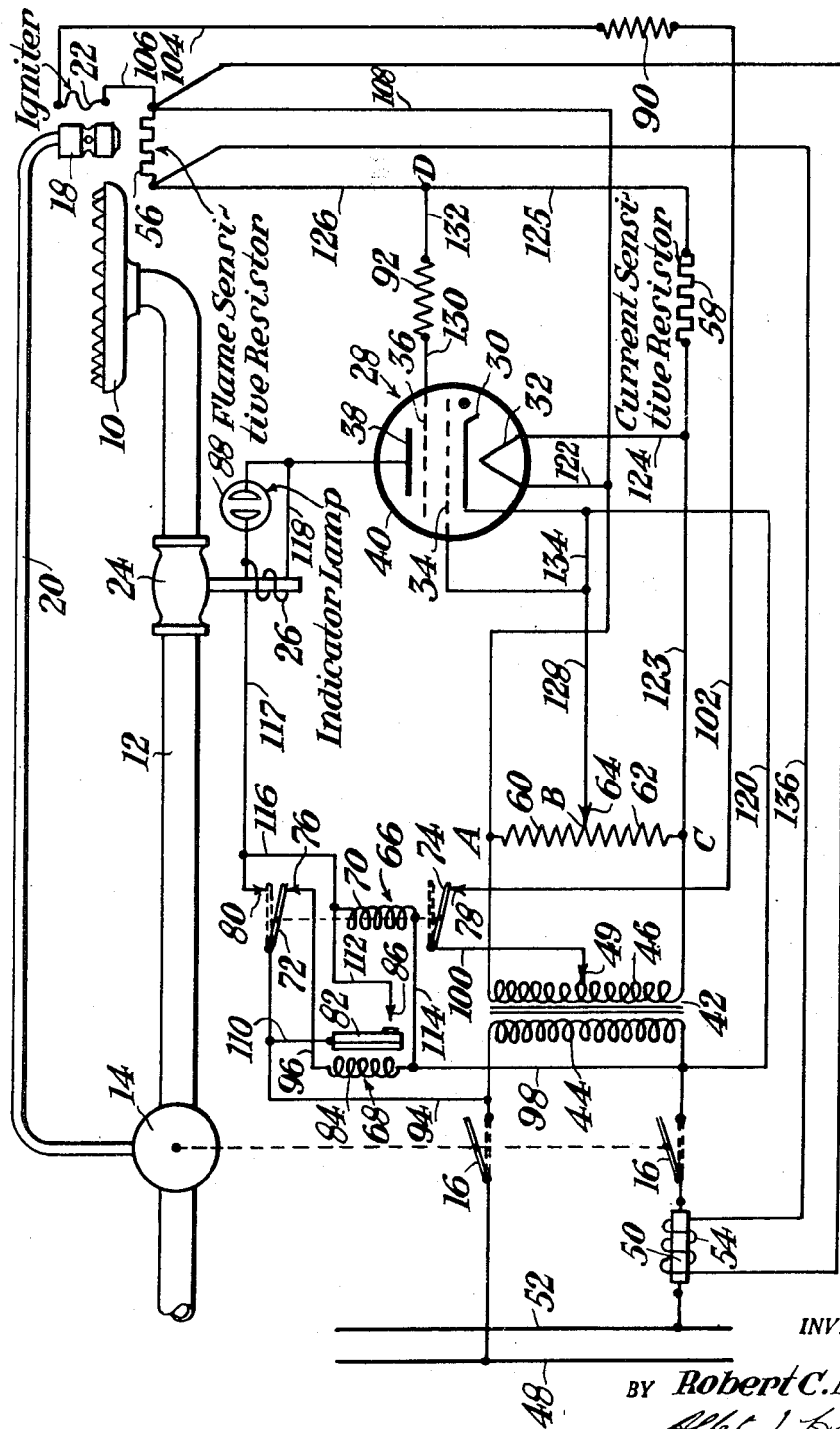

Aug. 21, 1951  R. C. MAIN  2,564,851
SAFETY CONTROL AND IGNITION SYSTEM FOR FUEL BURNERS
Filed March 5, 1947  2 Sheets-Sheet 1

INVENTOR.
BY *Robert C. Main.*
HIS ATTORNEY.

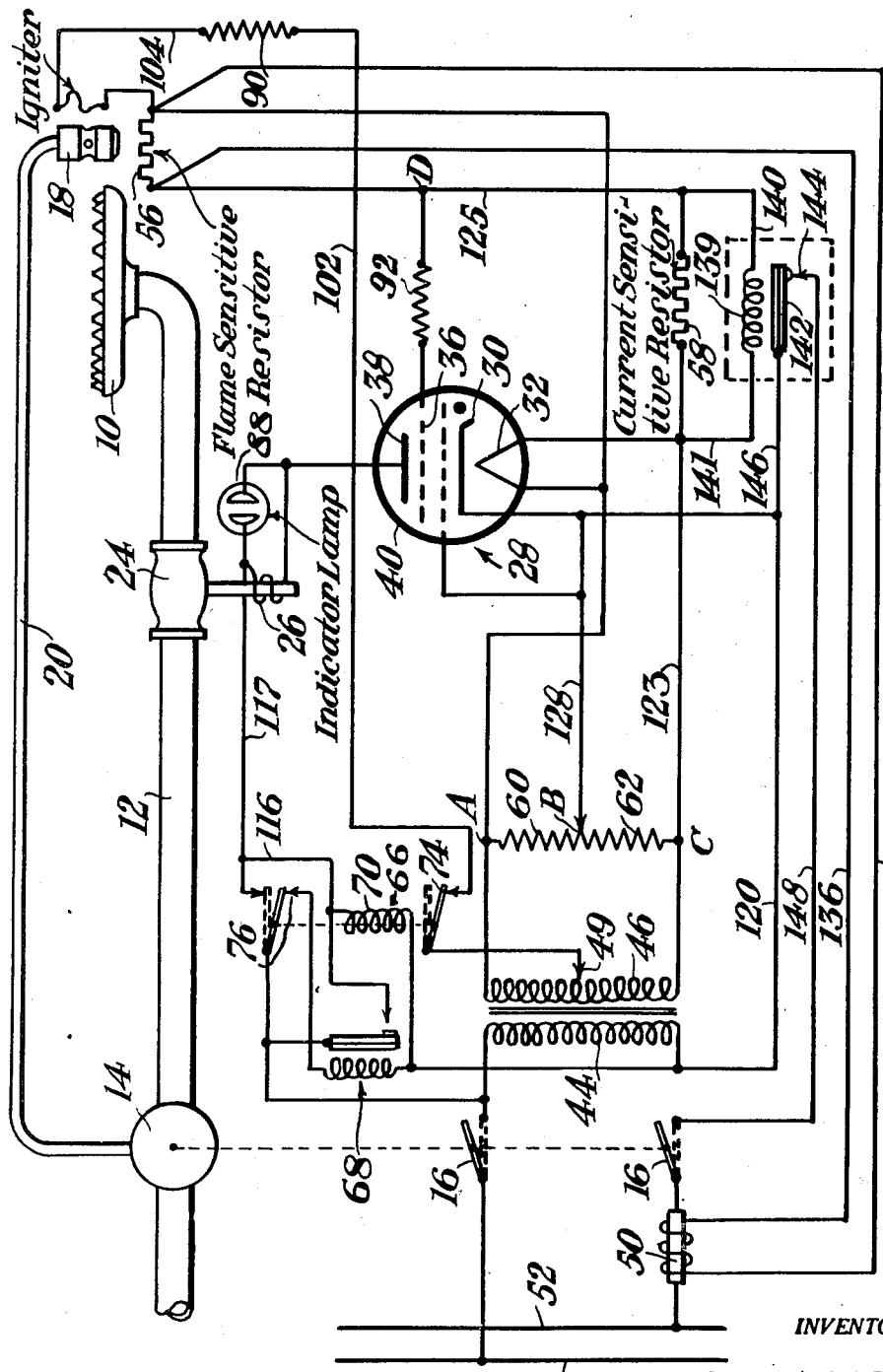

Patented Aug. 21, 1951

2,564,851

UNITED STATES PATENT OFFICE 2,564,851

SAFETY CONTROL AND IGNITION SYSTEM FOR FUEL BURNERS

Robert C. Main, Los Angeles, Calif., assignor to Robertshaw-Fulton Controls Company, a corporation of Delaware Application March 5, 1947, Serial No. 732,448

12 Claims. (Cl. 158—117.1)

This invention relates to control systems for fuel burning apparatus and, more particularly, to electrically operated safety control and ignition systems.

In the copending application of Charles K. Strobel, Serial No. 717,183 filed December 19, 1946, now Patent No. 2,486,340, granted October 25, 1949, there is disclosed a control system utilizing an electronic control device in conjunction with thermal resistance means for performing the controlling operation. In this copending application the input circuit of the electron tube is connected as the detector branch of an electrical bridge of which the thermal resistance means forms a branch or branches. As pointed out in the copending application, such an arrangement makes use of the desirable control characteristics of the thermal resistance means for varying the output energy of the electron tube in accordance with temperature conditions.

An object of the present invention is to utilize the output energy of an electronic device for direct operation of a fuel control means.

Another object of the invention is to facilitate the use of standard commercial types of fuel control means in the control system.

Another object of the invention is to simplify the circuit arrangements and reduce the number of component parts required to perform the controlling operation.

Another object of the invention is to afford adequate protection to the electronic device against premature application of energy thereto.

Another object of the invention is to ensure that the system will fail safely in the event of short-circuit or failure of component parts.

Other objects and advantages will become apparent from the following description taken in connection with the accompanying drawings, wherein:

Fig. 1 is a schematic view of the improved control system for controlling the flow of fuel to a fuel burning apparatus; and Fig. 2 is a similiar schematic view of a modification of the improved control system.

Referring more particularly to Fig. 1 of the drawings, the main burner 10 is shown as being supplied with fuel from a main fuel pipe 12 under control of the main fuel valve or cock 14 which, if desired, may also incorporate a thermostatic device (not shown) responsive to temperatures caused by operation of the main burner 10. The main fuel cock 14 also includes a double-break main switch 16 which is operated to closed position when the main fuel cock 14 is open and is normally opened when the main fuel cock 14 is closed.

A pilot burner 18 is located in proximity of the main burner 10 to ignite the fuel flowing therefrom and is supplied with fuel by a conduit 20 under control of the main fuel cock 14. Electric igniting means 22, preferably in the form of a coil of resistance wire, is located in lighting proximity to the pilot burner 18 to ignite the fuel issuing therefrom.

Electrically operable means is provided for controlling the flow of fuel to the main burner 10 and may take the form of an electromagnetic valve 24 normally biased to closed position by gravity, spring means or the like, to prevent the supply of fuel to the main burner 10. The valve 24 has an energizing coil 26 operatively associated therewith for causing it to open when energy of sufficient value is supplied to the coil 26. As will be apparent, the supply fuel to the main burner 10 is under control of both the main fuel cock 14 and the valve 24 while the supply of fuel to the pilot burner 18 is under control of the main fuel cock 14 only.

An electronic discharge device 28 of the thyratron type is provided for controlling operation of the valve 24 in conjunction with means to be described hereinafter. The cathode 30 of the electronic device 28 is indirectly heated by a heating filament 32 and these elements are housed, together with a control grid 34, shield grid 36, and anode 38 within the usual gas-filled envelope 40.

A step-down transformer 42 is included in the system and comprises a line voltage primary 44 and a secondary 46. The primary 44 is connected at one end through one pole of the switch 16 to a line wire 48. The opposite end of the primary 44 is connected through the opposite pole of the switch 16 to one terminal of a thermal cutout 50, the opposite terminal of which is connected to a line wire 52. While any suitable voltage may be employed, depending on the voltage of the power source available and the operating characteristics of the electronic device 28, the primary winding 44 is in this instance connected to a 115-volt source of alternating current and the secondary 46 is designed to operate at approximately six volts. A tap 49 is provided at approximately midway of the secondary winding 46, but this location can be varied as desired.

The thermal cutout 50 is provided with a heater 54 in the form of a coil of wire of suitable resistance characteristics. Thus, the cutout 50 is capable of opening the circuit of the primary 44 upon passage of over-current therethrough due to its series connection in this circuit. Moreover, the cutout 50 is also capable of opening the circuit of the primary 44 whenever the heater 54 becomes sufficiently heated by passage of current therethrough beyond a predetermined value.

The safety control system also includes flame responsive means of a known type which operates in conjunction with cooperating elements to shut-off the flow of fuel to the main burner 10 should the pilot burner 18 become extinguished. In this embodiment, the flame responsive means comprises a thermal resistance means 56 in the form of a coil of wire of material having normally a relatively low resistance and a positive temperature coefficient of resistance. The resistance means 56 is located in proximity of a flame from the pilot burner 18 and is adapted to increase appreciably in resistance value when heated thereby. It will be apparent that the passage of electrical energy through the resistance means 56 will also cause it to become heated to some extent, but it is the heating thereof by the flame of the pilot burner 18 which is primarily responsible for its usefulness in the present system.

A second thermal resistance means 58 is provided for cooperation with the resistance means 56 and is also formed from a coil of wire having normally a relatively low resistance and a positive temperature coefficient of resistance. This second resistance means 58 is not, however, exposed to the flame of any burner but is adapted to vary in resistance value only due to the passage of electrical energy therethrough. In addition to the resistance means 56 and 58 the system includes additional resistance means 60 and 62 forming the two sections of a potential divider defined by a tap 64. As will hereinafter be apparent, the resistance means 56, 58, 60 and 62 constitute the branches of a four-arm bridge circuit in which the detector arm is constituted by the input circuit of the electronic device 28.

While in the preferred embodiment of this invention the flame responsive means is described as comprising only the resistance means 56, it should be pointed out that two or more branches of the bridge circuit could be exposed to a flame. The branches formed by the resistance means could be provided with either positive or negative temperature coefficients, depending upon the flame exposure arrangements.

Time-delay mechanism including a relay 66 and a timing device 68 forms part of the control system. The relay 66 includes a coil 70 and a pair of spaced armature means 72, 74, operable thereby. The armature means 72, 74 is designed to cooperate with a pair of fixed contacts 76, 78, respectively, when the coil 70 is effectively deenergized. Upon energization of the coil 70 the armature means 72 is designed to cooperate with a fixed contact 80 while the armature means 74 merely ceases to cooperate with the contact 78.

The timing device 68 includes a bimetallic strip 82 having a heater 84 in the form of a coil of wire associated in heating proximity therewith. The bimetal strip 82 is adapted to warp when heated by the heater 84 and cooperate with a fixed contact 86.

The various elements of the system also include an indicator lamp 88 for indicating when the valve 24 is in fuel supplying position. This lamp 88 is connected in shunt with the coil 26 to be energized simultaneously therewith. A resistor 90 is provided for adjusting the value of the current supplied to the igniting means 22. In addition, a resistor 92 serves a similar function in limiting the current to the shield grid 36 to a safe value after the electronic discharge device 28 becomes conductive.

In the subsequent description of the operation of the system the various circuit connections for the described elements will be outlined together with the cooperation between the various elements to produce the desired results. With the various elements in the positions shown in Fig. 1 of the drawings and the system inoperative, fuel supply and 115-volt supply to the primary 44 of the transformer 42 are turned on simultaneously by operation of the main fuel valve 14. Thus, fuel will flow in the conduit 20 to the pilot burner 18 and the transformer 42 will be energized. The current flows to the heater 84 of the timing device 68 through the following circuit: Upper terminal of primary 44, wire 94, armature 72, contact 76, wire 96, coil 84 and wire 98 to the lower terminal of primary 44.

Meanwhile, the secondary 46 is energized and a portion of the transformer output is utilized to energize the igniting means 22 as follows: tap 49, wire 100, armature means 74, contact 78, wire 102, resistor 90, wire 104, igniting means 22, wire 106, and wire 108 to the upper terminal of secondary 46.

Upon the igniting means 22 reaching igniting temperature, the fuel issuing from the pilot burner 18 is lighted thereby, but due to the valve 24 being still closed there is no flame produced at the main burner 10. In a few seconds the heater 84 heats the bimetal strip 82 sufficiently to cause it to warp and engage the contact 86. The relay coil 70 is then energized through the following circuit: upper terminal of the primary 44, wire 94, wire 110, bimetal 82, contact 86, wire 112, coil 70, wire 114 and wire 98 to the lower terminal of the primary 44.

The armature means 72, 74, now move to their attracted positions. Armature means 72 moves into engagement with contact 80 while armature means 74 becomes disengaged from contact 78. As the armature means 74 and contact 78 control the described circuit to the igniting means 22, the latter now becomes deenergized. Moreover, the circuit to the heater coil 84 is also deenergized for the same reason. Due to engagement of the armature means 72 with the contact 80, an additional circuit is established for the relay coil 70 and a circuit is established for the anode 38 of the electronic device 28.

The relay coil 70 now becomes energized through the following circuit: lower terminal of primary 44, wire 98, wire 114, coil 70, wire 116, wire 117, contact 80, armature means 72 and wire 94 to the upper terminal of primary 44. Thus, although the bimetal strip 82 cools and becomes disengaged from contact 86, the relay coil 70 remains energized through the described circuit. It will be apparent that in the attracted position of the armature means 72 the relay coil 70 remains energized from the primary side of the transformer 42 at approximately 115 volts. This voltage is also applied to the anode circuit of the electronic discharge device 28 through the following circuit: upper terminal of primary 44, wire 94, armature means 72, contact 80, wire 117, valve coil 26, wire 118, anode 38, cathode 30 and wire 120 to the lower terminal of the primary 44.

The cathode 30 is heated by the filament 32 which is connected to the six-volt secondary 46 by a wire 122 from one end of the heating filament 32 to wire 108 and by a wire 124 from the opposite end of filament 32 to a wire 123 connected to the lower terminal of secondary 46. The bridge circuit previously mentioned is connected across the six-volt secondary 46 as follows: upper terminal of secondary 46, wire 108, bridge junction A, resistance means 60, junction B, resistance means 62, junction C, wire 123, resistor 58, wire 125, junction D, wire 126, resistor 56 and wire 108 back to junction A, it being noted that wire 123 completes the connection of junction C back to the lower terminal of secondary 46.

The detector arm of the aforesaid bridge circuit comprises a wire 128 connecting the tap 64 at junction B with the control grid 34, a wire 130 connecting the shield grid 36 with one end of resistor 92, and a wire 132 connecting the opposite end of the resistor 92 to the wire 126 at junction D. A wire 134 extending between the wires 128 and 120 serves to connect the control grid 34 and the cathode 30 together.

The completion of the anode circuit by operation of the armature means 72 into engagement with the contact 80 does not cause immediate energization of the coil 26 of the valve 24 until there is a flow of full average anode current. The potential established by the secondary 46 across the described bridge circuit is of the opposite polarity to that supplied to the described anode circuit of the electronic device 28. The magnitude of this voltage is such that the negative bias on the shield grid 36 prevents the control device 28 from becoming conductive until this bias voltage is sufficiently reduced to permit such functioning. It may be noted that the bias of the shield grid 36 is an alternating voltage that is approximately 180 degrees out of phase with the anode voltage. The magnitude of this grid bias becomes sufficiently reduced by the heating of the resistance means 56 by the flame of the pilot burner 18 which occurs after a predetermined period of operation of this burner.

It will be apparent that in normal operation the electronic device 28 becomes conductive on the anode positive half-cycle while the shield grid 36 regains control on the anode negative half-cycle. It will furthermore be apparent that the connections of the shield grid 36 and the control grid 34 could be interchanged if desired without affecting the essential operation of the device. Upon the electronic device 28 becoming conductive as described, the output circuit thereof supplies sufficient energy to the coil 26 of the valve 24 to cause the latter to open and admit a continuous supply of fuel from the main fuel pipe 12 to the main burner 10 where it is ignited by the pilot burner 18. The energy so supplied to the coil 26 is half-wave or pulsating direct current at approximately 115 volts due to the rectifying effect of the electronic device 28. The indicating lamp 88 which shunts the coil 26 becomes illuminated at this time.

The system will remain in the steady state operation described until manually shut-off by operation of the main fuel valve 14 or until the flame at the pilot burner 18 is extinguished. In the latter case, the potential drop across the resistance means 56 is decreased as soon as this element starts to cool. The rate of decrease of this potential is augmented by the action of the resistor 58 which is also responsive to temperature changes as described. The bias of the shield grid 36 is finally changed in a negative direction so as to cause the output current of the electronic device 28 to decrease sufficiently to cause effective deenergization of the coil 26. The valve 24 thereupon closes to shut-off the fuel supply to the main burner 10. Moreover, the indicator light 88 is also extinguished as soon as the current flow through the electronic device 28 ceases. Since the main switch 16 must be opened in order to deenergize the circuit of the relay coil 70 and return the armature means 70, 74, to their initial position, the system is not automatically recycling but requires manipulation of the main fuel cock 14 to begin a new cycle of operation.

In the event that an electrical power interruption occurs, the flame at the pilot burner 18 does not become extinguished although the coil 26 of the valve 24 is deenergized for the duration of the power failure. Upon resumption of the power supply the system automatically recycles since the thermal resistance element 56 has remained heated by the flame from the pilot burner 18.

The thermal resistance element 56 may conceivably become fractured at some time during use of the system. The cutout 50 then provides the desired safety control inasmuch as such fracture would not cause deenergization of the coil 26 of valve 24 due to the shunt connection of this element with the resistance means 56. The heater coil 54 of the cutout 50 is connected in parallel circuit with the resistance means 56 by wire 136 from one end of coil 54 to one end of resistance means 56 and by a wire 138 connecting the opposite ends of the coil 54 and resistance means 56. Hence, upon failure of the thermal resistance 56 the current flow through the heater 54 is increased sufficiently to cause this heater to operate the cutout 50. Since the cutout 50 is connected in the line ahead of the main switch 16 its effect will be the same as opening of this switch and the circuit will be completely deenergized. The cutout 50 also acts in the conventional manner to protect the entire system from damage which would result from a short-circuit in any part of the wiring. The excessive current flow through the cutout 50 upon the occurrence of a short circuit will cause the operation of the cutout as described in connection with its operation due to the heater 54.

The electronic device 28 is also protected against the application of voltage to the anode 38 until after the cathode 30 has been sufficiently heated by the filament 32. It is apparent that the timing device 68 thus not only performs this useful function but also serves as a means for deenergizing the igniter 22 after it has served its purpose in igniting the fuel flowing from the pilot burner 18.

In the embodiment disclosed in Fig. 2 the system has been adapted for recycling operation should the flame at the pilot burner 18 become extinguished without operation of the main fuel cock 14. As the majority of parts are identical with those disclosed in the embodiment shown in Fig. 1, similar reference numerals have been used where applicable.

Referring now more particularly to Fig. 2 of the drawings, a heater 139 in the form of a coil of resistance wire is connected by wires 140 and 141 from opposite ends thereof in parallel circuit with the resistance means 58. A bimetal strip 142 is located in proximity to the heater 139 and is adapted to warp and disengage a fixed contact 144 when sufficiently heated. The bimetal strip 142 is connected by a wire 146 to the wire 120 and the contact 144 is connected by a wire 148 to one terminal of the switch 16. In this embodiment, however, there is no connection between the wire 120 and the lower pole of the switch 16 except through the circuit just traced. As the thermally responsive switching means comprising bimetal strip 142 and contact 144 has a normally closed position, the absence of the described connection will not affect the operation of the system during normal starting and running conditions.

In the operation of the embodiment shown in Fig. 2 the system will operate as described in connection with Fig. 1 except in the event that the flame from the pilot burner is extinguished as described. The consequent cooling of the resistance means 56 which is exposed to this flame causes an increase in the voltage across the resistance means 58 which is thermally responsive to current flow therethrough and this increase is sufficient to cause operation of the recycling device. The heater 139 is caused to generate sufficient heat for the bimetal strip 142 to warp and discontinue its engagement with contact 144. Consequently, the circuit of the relay coil 70 is discontinued in the same manner as if the main switching means 16 had been operated. As this opening of the circuit is momentary only, the recycling action then occurs. Thus, the heater 139 becomes deenergized and ceases to cause the bimetal strip 142 to be disengaged from the contact 144. When the bimetal strip 142 again engages contact 144 the system is recycled in the manner outlined for the starting operation in connection with Fig. 1.

It will be observed that the recycling operation does not occur until after an appropriate purge period. The heating period of the bimetal strip 142 is made sufficiently long to permit unburned fuel from the previous operation to escape before the pilot burner 18 again produces a flame. This purge period can be set by any appropriate adjusting means so that it is equal to the shutoff time for the highest expected line voltage. For lower line voltages the purge period will increase.

While a preferred embodiment of the invention and a modification thereof have been shown and described it is apparent that many other modifications will occur to those skilled in the art. Hence, the invention is not deemed to be limited to the forms shown and described or otherwise than as defined by the scope of the claims appended hereto.

I claim:

1. In a control system for fuel burning apparatus having a source of fuel supply, the combination of valve means for controlling the flow of fuel to be burned in said burning apparatus, electromagnetic means having a coil operatively associated with said valve means and adapted when energized for operating said valve means between controlling positions, a source of electric energy, an electron discharge device having the output circuit thereof connected to said source and to said coil for supplying energy directly thereto, a bridge circuit having opposite junctions connected to said source, said bridge circuit comprising a branch connected to the input circuit of said device, and a plurality of resistance means in at least two other branches of said bridge, one said resistance means adapted to be responsive to temperature changes caused by the heat of said burning fuel for varying in resistance value and being cooperable with the other said resistance means for causing variations in the output energy supplied to said coil and thereby controlling the operation of said valve means.

2. In a control system for fuel burning apparatus having a source of fuel supply, the combination of valve means for controlling the flow of fuel to be burned in said burning apparatus, electromagnetic means having a coil operatively associated with said valve means and adapted when energized for operating said valve means between controlling positions, an electron discharge device having cathode, anode and grid elements, a source of electrical energy, a bridge circuit having a detector branch including said cathode and grid elements, connections between said source, said cathode, said anode and said coil for supplying energy directly to said coil when said electron discharge device is conductive, means for connecting opposite junctions of said bridge circuit to said source for normally maintaining said grid element at a potential such that said electron discharge device is effectively non-conductive, and a plurality of resistance means in at least two other branches of said bridge circuit, one said resistance means being adapted to be responsive to temperature changes caused by the heat of said burning fuel for varying in resistance value and being cooperable with the other said resistance means to maintain said grid element at a different potential such that said electron discharge device is conductive for supplying energy directly to said coil whenever said one resistor is in one thermal condition.

3. In a control system for fuel burning apparatus having a source of fuel supply, the combination of valve means for controlling the flow of fuel to be burned in said burning apparatus, electromagnetic means having a coil operatively associated with said valve means and adapted when energized for operating said valve means between controlling positions, an electron discharge device having cathode, anode and grid elements, a transformer having primary and having secondary windings adapted to supply energy from a source of alternating potential, a bridge circuit having a detector branch including said cathode and grid elements, connections between said source, said cathode, said anode and said coil for supplying full anode energy directly to said coil when said device is conductive, means for connecting opposite junctions of said bridge circuit to said secondary for normally applying a negative bias to said grid element sufficient to render said device effectively non-conductive, and a plurality of resistance means in the other branches of said bridge circuit including a pair of variable resistors, one said resistor being adapted to be responsive to temperature changes caused by the heat of said burning fuel for varying in resistance value and cooperating with the other said resistance means to reduce the bias voltage on said grid element sufficiently to render said device conductive for supplying full anode energy directly to said coil whenever said one resistor is in one thermal condition.

4. In a control system, a grid controlled electron discharge device having a heater, biasing means adapted for normally applying a negative bias to said grid sufficient to render said device effectively non-conductive, said biasing means including temperature responsive means adapted to vary in resistance value upon an increase in temperature and raise the potential of said grid sufficiently to render said device conductive, a source of energy, a control device having a coil and armature means operable thereby between controlling positions, a timing device connected to said source and having contacts controlling the supply of energy to said coil for operation of said armature means, connections between said source and the output circuit of said electron discharge device and controlled by said armature means, connections between said source and said heater for energizing the same for a time period set by said timing means and prior to operation of said armature means to complete the connections of said output circuit, and connections between said source and said biasing means for energizing the same at the inception of said time period.

5. In a control system, a grid controlled electron discharge device, biasing means adapted for normally applying a negative bias to said grid sufficient to render said device effectively non-conductive, said biasing means including temperature responsive means adapted to vary in resistance value upon an increase in temperature and raise the potential of said grid sufficiently to render said device conductive, a source of energy, heating means for said temperature responsive means, means for initiating operation of said heating means, a control device having a coil and armature means operable thereby between controlling positions, a timing device connected to said source and having contacts controlling the supply of energy to said coil for operation of said armature means, connections between said source and the output circuit of said electron discharge device, connections betewen said source and said initiating means for energizing the same for a time period set by said timing means, and connections between said source and said biasing means for energizing the same at the inception of said time period.

6. In a control system, a grid controlled electron discharge device having a heater, biasing means adapted for normally applying a negative bias to said grid sufficient to render said device effectively non-conductive, said biasing means including temperature responsive means adapted to vary in resistance value upon an increase in temperature and raise the potential of said grid sufficiently to render said device conductive, a source of energy, heating means for said temperature responsive means, means for initiating operation of said heating means, a control device having a coil and armature operable thereby between controlling positions, a timing device connected to said source and having contacts controlling the supply of energy to said coil for operation of said armature means, connections between said source and the output circuit of said electron discharge device and controlled by said armature means, connections between said source, said heater and said initiating means for energizing the same for a time period set by said timing means and prior to operation of said armature means to complete the connections of said output circuit, and connections between said source and said biasing means for energizing the same at the inception of said time period.

7. A fuel burner control system, electrically operable means for controlling a fuel supply to be burned, an electron discharge device having the output circuit thereof connected to said electrically operable means for supplying energy thereto, a source of electric energy, a control device including a coil and armature means operable thereby between different positions relative to cooperating contact means, means for connecting said coil and said source, electric igniting means having an energizing circuit controlled by cooperation between said armature means and said contact means, a bridge circuit comprising a branch connected to the input circuit of said device, and a plurality of resistance means in at least two other branches of said bridge, one said resistance means being responsive to temperature changes caused by the heat of the burning fuel for varying in resistance value and being cooperable with the other said resistance means for causing variations in the output energy supplied to said electrically operable means, and means cooperable with said connecting means for controlling the energization of said coil to position said armature means for energization of said igniting means only when said one resistance means is in unheated condition.

8. A control system for fuel burning apparatus having main and pilot burners, the combination of electrically operable means for controlling the fuel supply to the main burner, a relay including a coil and one set of contact means disposed to be opened and another set of contact means disposed to be closed upon energization of said coil, a source of electric energy, electric igniting means for the pilot burner, an electron discharge device having the output circuit thereof connected to said electrically operable means and said source through said other set of contact means, means for biasing the input circuit of said device so as to hold the energy in said output circuit below the value necessary to energize said electrically operable means, said last means including a resistance means responsive to temperature changes caused by operation of the pilot burner and adapted to vary in resistance value in one thermal condition to cause a shift in said biasing sufficiently to energize said electrically operable means, a timing device connected to said source and having contacts controlling the supply of energy to said coil for operation of said contact means, means for connecting said igniting means to said source and said one set of contact means for energization of said igniting means for a time period set by said timing means, and means for connecting said biasing means to said source for energization of said biasing means at the inception of said time period.

9. A control system for fuel burning apparatus having main and pilot burners, the combination of electrically operable means for controlling the fuel supply to the main burner, a relay including a coil and one set of contact means disposed to be opened and another set of contact means disposed to be closed upon energization of said coil, a source of electric energy, electric igniting means for the pilot burner connected to said source through said one set of contact means, an electron discharge device having the output circuit thereof connected to said electrically operable means and said source through said other set of contact means, means for initially biasing the input circuit of said device so as to hold the energy in said output circuit below the value necessary to energize said electrically operable means, said last means including resistance means responsive to temperature changes caused by operation of the pilot burner and adapted to vary in resistance value in one thermal condition to cause a shift in said biasing sufficiently to energize said electrically operable means, means for connecting said relay coil to said source in series circuit with said other set of contact means and in shunt with said output circuit and said electrically operable means, said last connecting means maintaining said coil energized irrespective of a resumption of said initial biasing upon failure of the flame at the pilot burner, switching means controlling the last said connecting means and having a normally closed position, and means responsive to said flame failure for causing operation of said switching means to open position.

10. A control system for fuel burning apparatus having main and pilot burners, the combination of electrically operable means for controlling the fuel supply to the main burner, a relay including a coil and one set of contact means disposed to be opened and another set of contact means disposed to be closed upon energization of said coil, a source of electric energy, electric igniting means for the pilot burner connected to said source through said one set of contact means, an electron discharge device having the output circuit thereof connected to said electrically operable means and said source through said other set of contact means, means for initially biasing the input circuit of said device so as to hold the energy in said output circuit below the value necessary to energize said electrically operable means, said last means including resistance means responsive to temperature changes caused by operation of the pilot burner and adapted to vary in resistance value in one thermal condition to cause a shift in said biasing sufficiently to energize said electrically operable means, means for connecting said relay coil to said source in series circuit with said other set of contact means and in shunt with said output circuit and said electrically operable means, said last connecting means maintaining said coil energized irrespective of a resumption of said initial biasing upon failure of the flame at the pilot burner, thermally responsive switching means controlling the last said connecting means and having a normally closed position, and a heater for said switching means connected in parallel circuit with one of said resistance means and being responsive to the variation in energy value across said resistance means upon said flame failure for causing operation of said switching means to open position.

11. In a control system, means for establishing a condition, electrically operable means adapted to control a condition which should exist only when the first said condition is established, resistance means responsive to said first condition for varying the supply of electric energy to said electrically operable means in accordance with the presence or absence of said first condition, means cooperable with said condition responsive means for rendering said energy supply insufficient for said electrically operable means to establish the second said condition in the absence of said first condition, connections between a source of energy and said electrically operable means including said condition responsive means in parallel circuit with said electrically operable means, a thermal cut-out responsive to excess energy supply thereto and being operable for controlling said connections between said source and said electrically operable means, and connections including a heater for said cut-out responsive to failure of said condition responsive means for likewise causing operation of said cut-out in the absence of said excess energy supply.

12. In a control system for fuel burners having main and pilot burners, the combination of electrically operable means for controlling the fuel supply to the main burner, an electron discharge device having the output circuit thereof connected to said electrically operable means for supplying energy thereto, a bridge circuit comprising a branch connected to the input circuit of said device and a branch containing means responsive to temperature changes therein caused by the presence of a flame at the pilot burner, connections between opposite junctions of said bridge and a source of electric energy, a thermal cut-out associated with said connections and operable for discontinuing said input circuit upon an increase in energy supply to said cut-out beyond a predetermined value, and connections including a heater for said cut-out responsive to failure of said temperature responsive means causing an increase in energy supply to said heater beyond a predetermined value for likewise causing said operation of said cut-out in the absence of said increased energy supply to said cut-out.

ROBERT C. MAIN.

REFERENCES CITED

The following references are of record in the file of this patent:

UNITED STATES PATENTS

| Number | Name | Date |
|---|---|---|
| 1,880,871 | Denison | Oct. 4, 1932 |
| 2,290,091 | Brown et al. | July 14, 1942 |
| 2,304,641 | Jones | Dec. 8, 1942 |
| 2,327,690 | Ackerman | Aug. 24, 1943 |
| 2,379,113 | Strobel | June 26, 1945 |
| 2,397,311 | Eskin et al. | Mar. 26, 1946 |